Sept. 8, 1964       SHUNJI ISHII ETAL       3,147,728
           SHIP FOR THE TRANSPORTATION OF HIGH
               TEMPERATURE MOLTEN MATERIAL
Filed June 17, 1960                    7 Sheets-Sheet 1
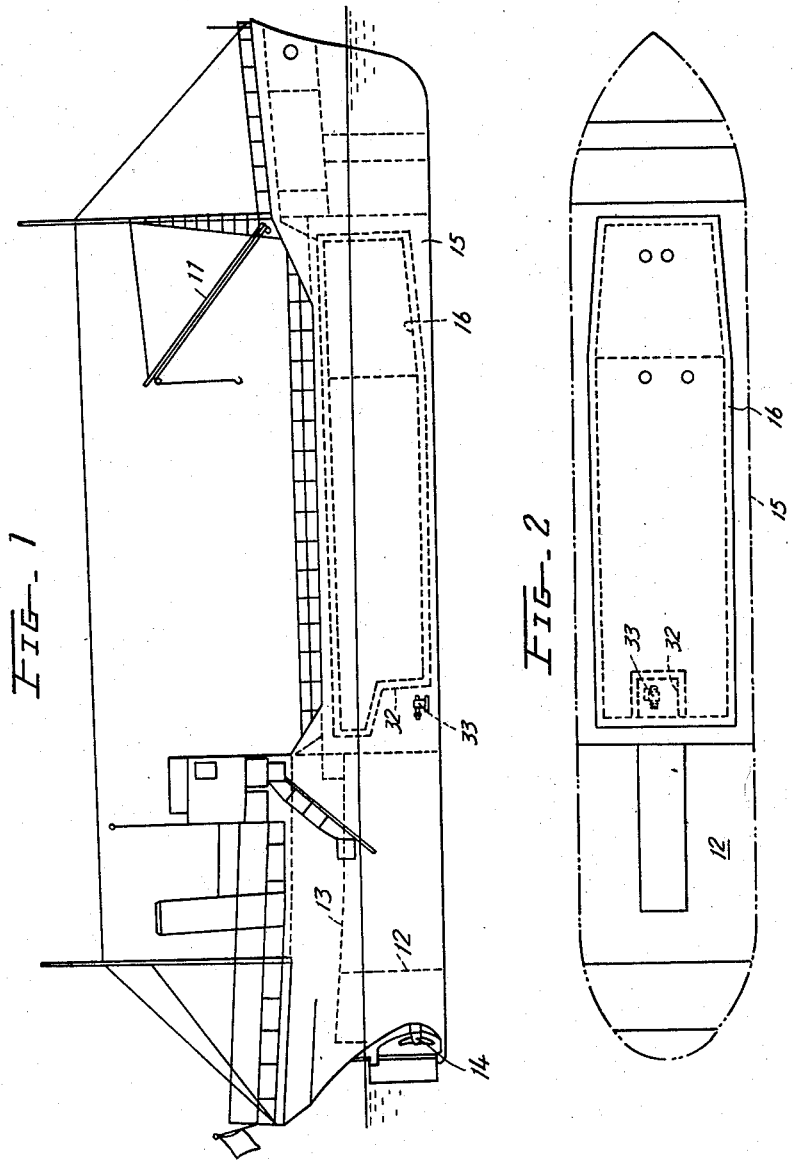
INVENTORS
Shunji Ishii
Gensaku Kayashi
BY

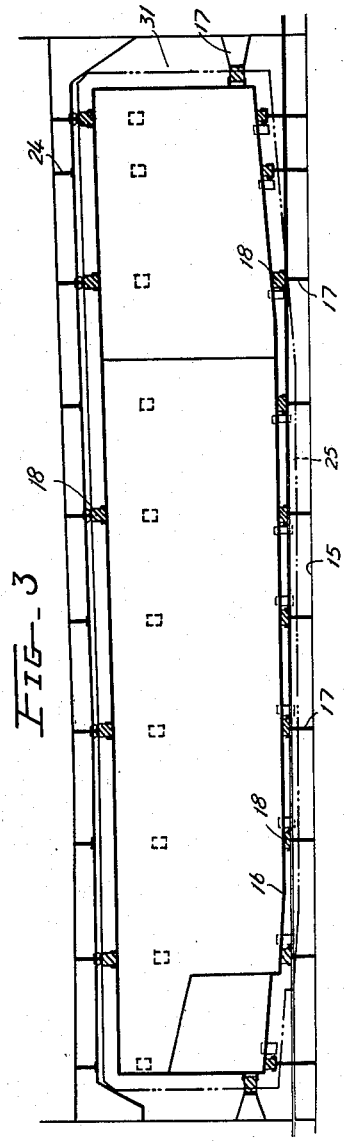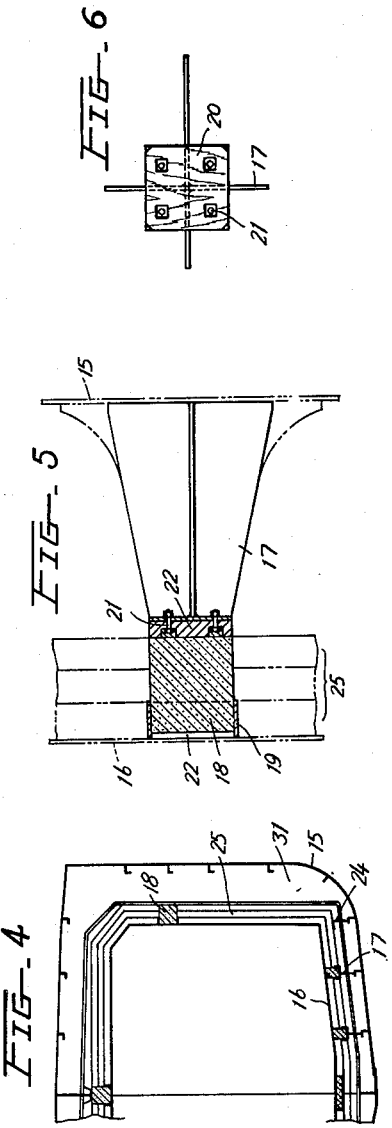

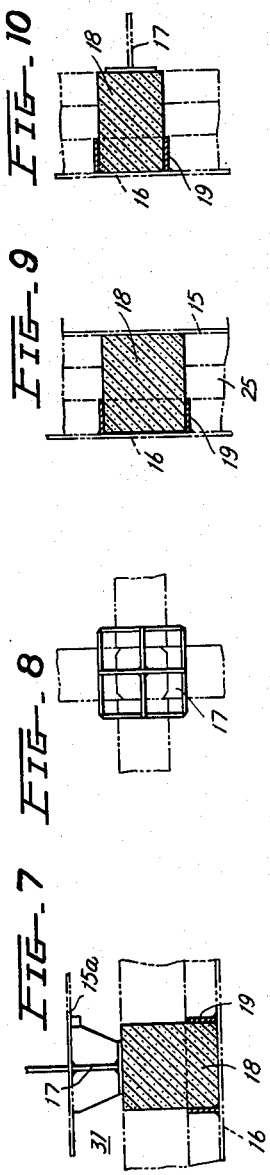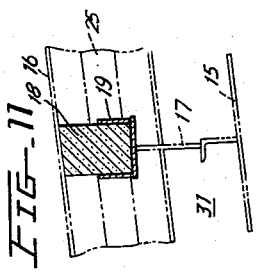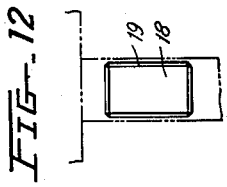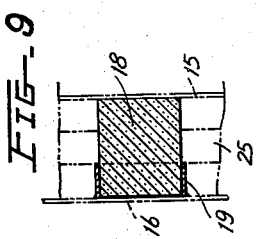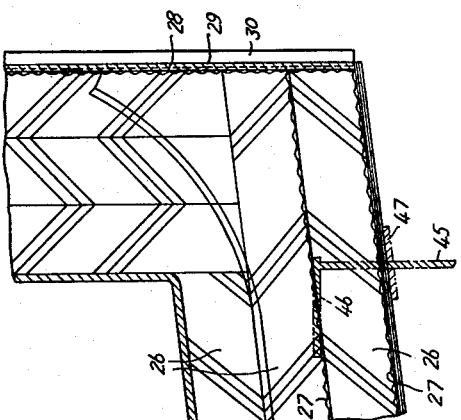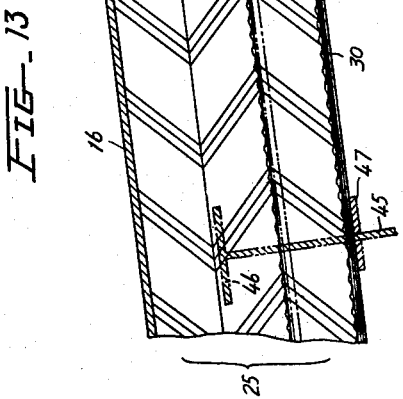

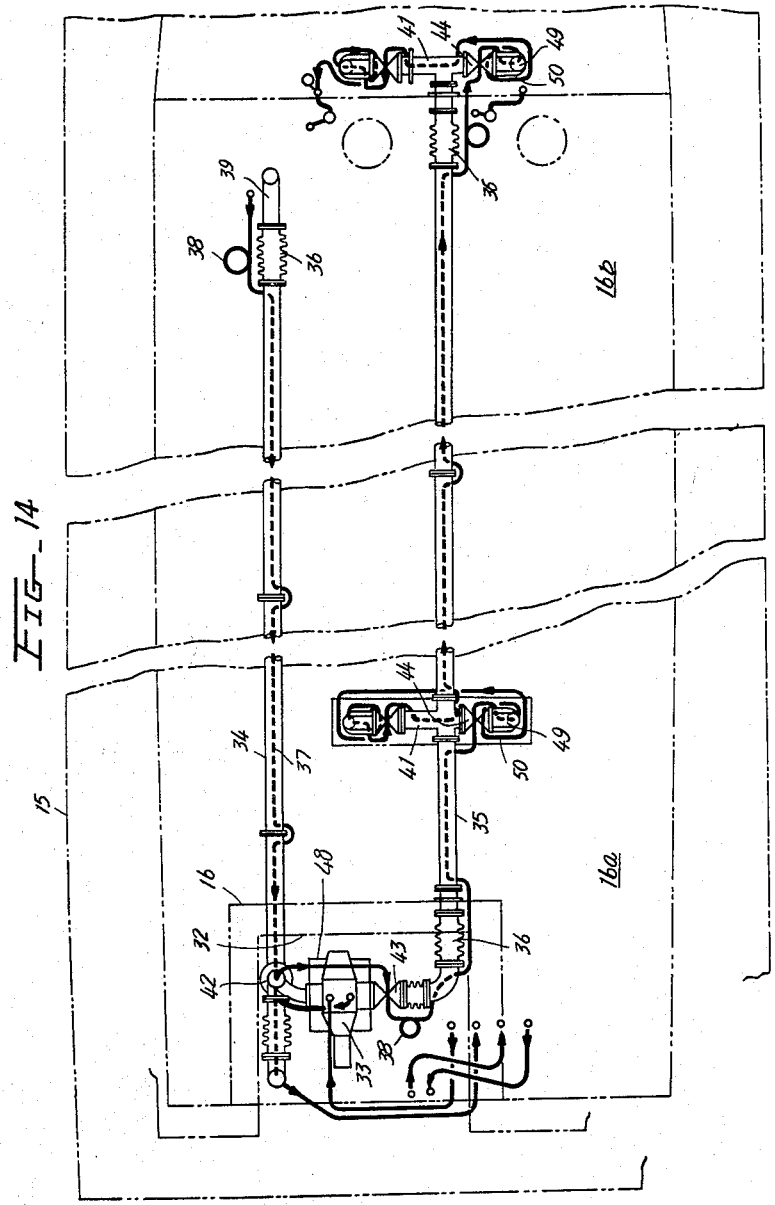

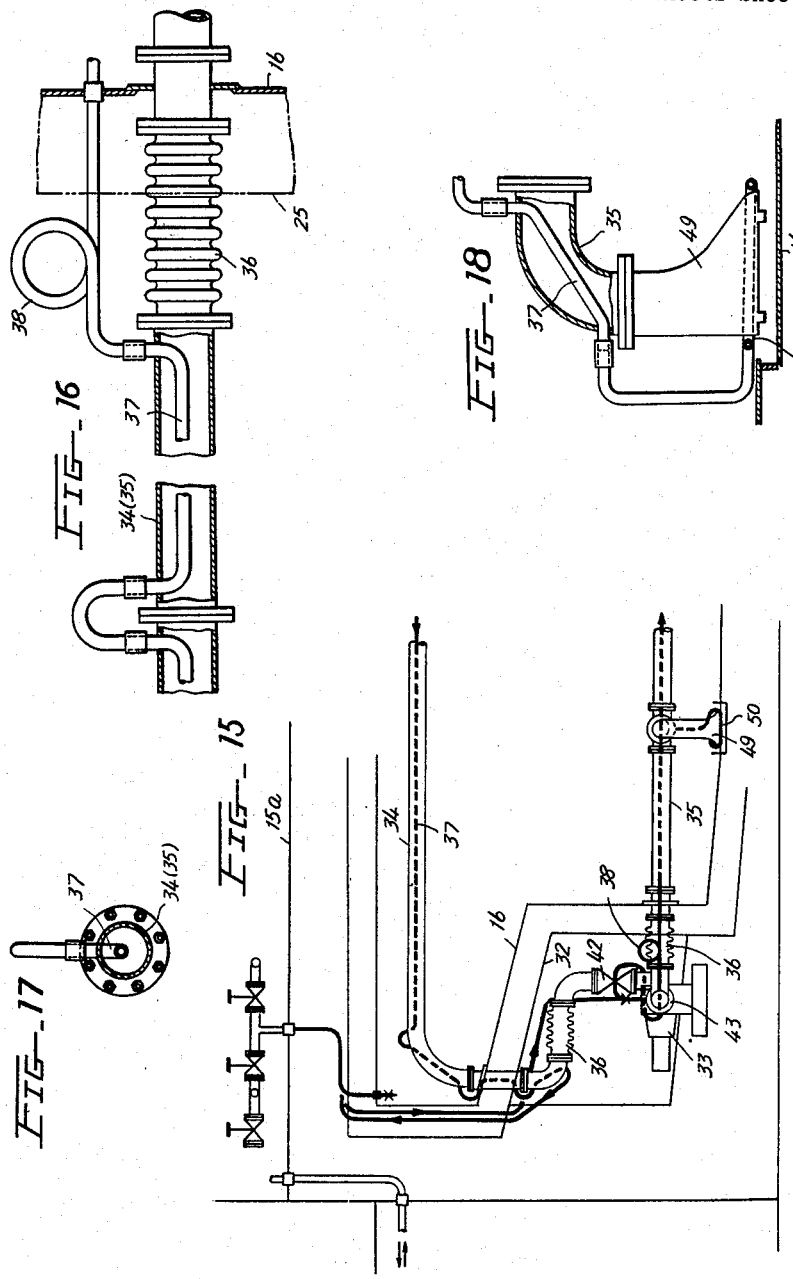

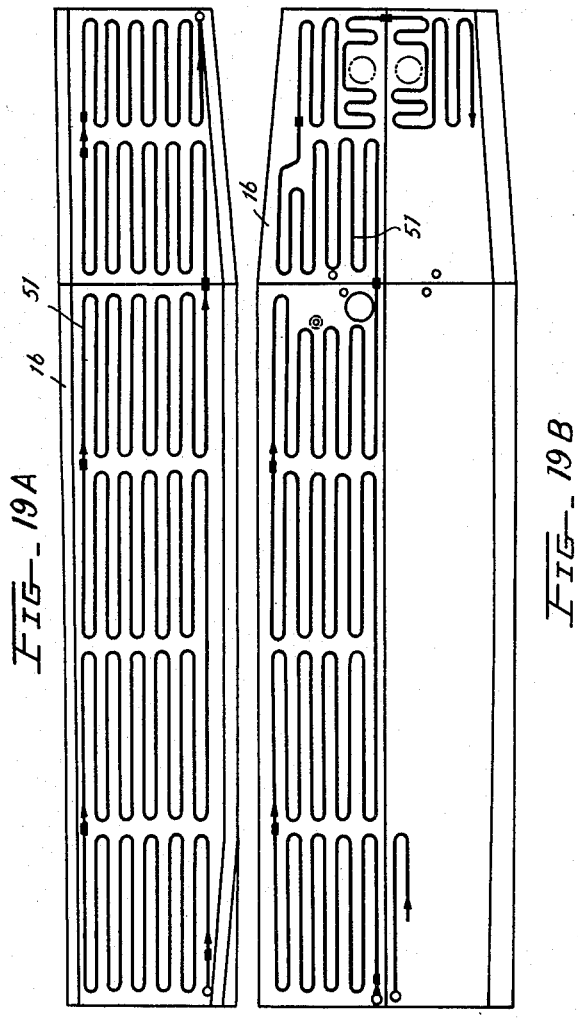

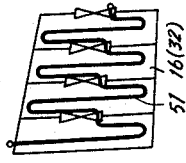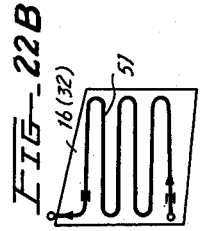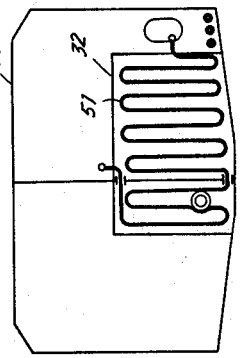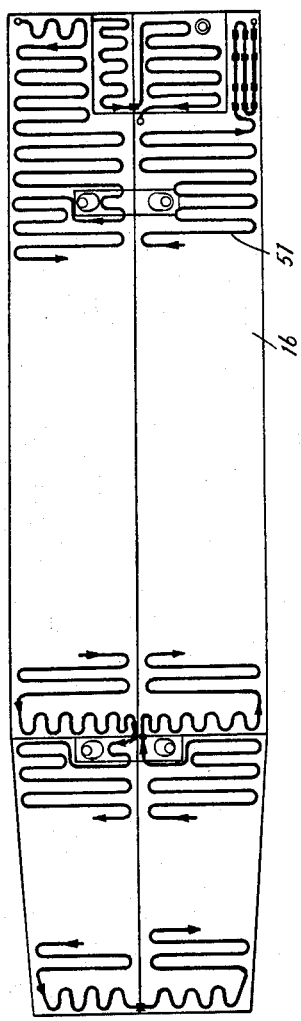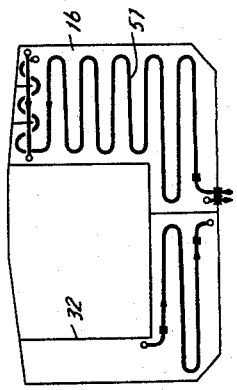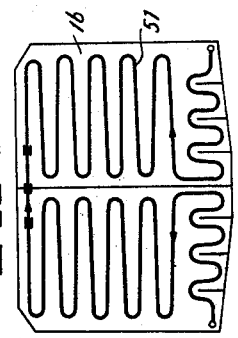

United States Patent Office 3,147,728
Patented Sept. 8, 1964

3,147,728
SHIP FOR THE TRANSPORTATION OF HIGH
TEMPERATURE MOLTEN MATERIAL
Shunji Ishii, Tokyo, and Gensaku Hayashi, Shimizu-shi,
Japan, assignors to Nippon Kokan Kabushiki Kaisha,
Tokyo, Japan, a corporation of Japan
Filed June 17, 1960, Ser. No. 36,897
Claims priority, application Japan June 20, 1959
1 Claim. (Cl. 114—74)

The present invention relates to a ship for the transportation of high temperature molten material, which, for instance, can directly load, transport and unload molten asphalt while its temperature is kept at a range of about 200° C.

Attempts have been made to load, transport and unload, respectively, various cargos in a fluid form.

The property of molten asphalt is such that its viscosity increases and it becomes sticky or solid when it is cooled below a certain temperature range, the temperature depending on the compositions and the place of production of asphalt, which temperature may be, for example, approximately 130° C. It is well known, however, that great technical difficulties are encountered in melting asphalt once it becomes sticky or solid. When such solid asphalt is heated in a pot of a certain size, for instance, only the heated part or its immediate upper part is melted, while other parts of asphalt remain in their solid state. The melting of asphalt is confined to a small and narrow area. Since there is no appreciable convention as in other liquids, it is almost impossible to transform the asphalt entirely into its molten state. This tendency increases particularly in the case where huge tanks are provided in the ship. Particularly, huges waves of sea-water outside the ship act as a kind of cooling medium to the molten asphalt in the ship, and therefore it is inevitable that some parts of asphalt, for instance in the bottom part of the tank, are cooled down to a temperature range at which they become sticky or solid even though other parts, for instance the central part, are kept in their molten state. If one part of the asphalt reaches a temperature range, at which it becomes sticky or solid, solidification develops more and more from that part, and once the asphalt becomes sticky or solid, it is rather difficult to remelt it. Since asphalt catches fire at a little higher temperature, for example at about 240° C., it cannot be heated above a predetermined temperature. Further, as the tank of the ship is too huge, it becomes practically impossible to take out such asphalt unless the ship is destroyed or the asphalt is broken into pieces of a certain size after it solidifies completely.

Because of the above-mentioned property of the asphalt, there has been no attempt to transport asphalt by sea or river in its molten state. In the past, it has been customary to transport it is drum-type cans or paper bags. When such drum-type cans or paper bags are used, it requires, first, to prepare a number of special drum-type cans or paper bags, and second, the labor for filling up these containers. Because of the existence of considerable waste spaces among these drum-type cans or paper bags when loaded, and their own weight and volume, the carrying capacity of the ship is necessarily greatly reduced. Besides that, they need large size machines and much labor in loading and unloading. These disadvantages naturally increase the cost of transportation beyond a tolerable amount. It is also very difficult to take out filled solid asphalt from such drum-type cans, and it is almost impossible to use the drum-type cans or paper bags again which were once filled with asphalt. The cost of labor and fuel for taking out the asphalt is rather high. Further, the loss of asphalt caused by its sticking to cans or bags is considerably large. These losses increase the cost of the asphalt accordingly, and thereby the cost of construction unexpectedly. It is thus apparent that these conventional ways are not truly suitable and effective.

It is, therefore, one object of the present invention to provide a ship for the transportation of material, like asphalt, in its molten state, thereby avoiding the above-mentioned disadvantages in the transportation and in the construction.

It is another object of the present invention to provide a ship for the transportation of material in its molten state, which makes it possible to isolate completely the asphalt in the tank from the hull and the sea-water outside the ship, by providing an air space between the hull and the tank in it and thermally insulating the tank from the hull made of metal. The tank is surrounded by heat insulating material around it and the molten asphalt is disposed in the tank when transported. Therefore, the molten asphalt can be maintained at a high temperature for a considerably long time and can be transported in its proper fluid state. It cannot occur that a part is cooled and becomes sticky or solid.

It is yet another object of the present invention to provide a ship for the transportation of high temperature molten material, wherein tube lines are disposed in or around the tank, through which steam or waste gas from the ship engine, or electric current or chemicals for heating is passed, and the asphalt can be heated, if necessary. Such heating keeps the asphalt in its perfect molten state even over a long voyage by means of the heat insulating means of the tank.

It is still another object of the present invention to provide a ship for the transportation of high temperature molten material which is equipped with pipes to let the molten asphalt flow in or out of the tank. These pipes have a cover which keeps them at a predetermined temperature. They also have tubes for heating inside the pipes, which are adapted to prevent the increase of the asphalt viscosity. By these means, it can be avoided that the asphalt cools down during the loading and unloading operation, the viscosity increases, so as to become harmful for a smooth loading, since asphalt solidifies in the pipes and the workers or sailors get burned by contacting the hot pipe lines. In accordance with the present invention, the cocks and the pumps have sometimes a special construction, in order to prevent the solidification of the asphalt in the pipes, while the loading or unloading of the molten asphalt is suspended. In order to make the operation of the cocks and the pumps reliable, the cock is of such structure that a clearance between the cock body and the valve becomes large, when the operation is stopped, and the pump is of such a structure, that the outside of the pump is properly heated. By these means, it can be prevented that the solidification of the residual asphalt causes the adhesion of movable parts of the machine and makes it impossible to resume the operation.

In order to prevent swinging, moving and vibration of the tank in the hull, occurring as a result of rolling and pitching of the ship during sailing or in port, the tank designed in accordance with the present invention has special supporting means, which also act as heat insulating means.

With these and other objects in view, which will become apparent in the following detailed description, the present invention will be clearly understood in connection with the accompanying drawings, in which:

FIGURE 1 is a side elevation of an entire ship, designed in accordance with the present invention;

FIG. 2 is a fragmentary top plan view thereof;

FIG. 3 is a vertical section of the supporting structure of the tank;

FIG. 4 is an enlarged view of a part shown in FIG. 3;

FIG. 5 is a sectional view showing the side supporting structure of the tank;

FIG. 6 is an end view of the supporting means;

FIG. 7 is a cross-section of the supporting and heat insulating means on the upper side wall of the tank;

FIG. 8 is an end view of the means shown in FIG. 7;

FIGS. 9 and 10 are cross-sections of the supporting structure on the side wall of the tank; FIG. 9 showing a structure in which the heat insulating material is supported by a kernel plate, and FIG. 10 showing a structure in which the material is mounted on a supporting element;

FIG. 11 is a cross-section of the supporting and heat insulating structure on the bottom side of the tank;

FIG. 12 is an end view of its supporting stand;

FIG. 13 is a cross-section of the heat insulating layers applied to the tank;

FIG. 14 is a diagrammatic view showing the pipe lines for performing the loading;

FIG. 15 is a diagrammatic vertical section view of the pump;

FIG. 16 is an elevation showing the pipe connection with the tank;

FIG. 17 is an end view thereof;

FIG. 18 is a side elevation of the inlet to the tank; and

FIGS. 19A, 19B, 20, 21A, 21B, 22A, 22B and 22C are diagrammatical views of pipe lines for heating of the tank.

Referring now to the drawings, and in particular to FIGS. 1 and 2, the entire construction of the ship for the transportation of asphalt designed in accordance with the present invention is disclosed, and comprises the cranes 11, an engine room 12, the crew cabins 13, the propeller screws 14 and other equipment, conventional in ship construction. In the center of the hull 15, a large asphalt tank 16 is provided, as shown in FIG. 1. The supporting structure of the asphalt tank 16 in the hull, is disclosed in FIGS. 3 to 12. The supporting elements 17 are fixed on the hull 15 and the heat insulating supports 18 connected with the supporting elements 17 are provided around the tank 16 at a plurality of points. Its particular structure is shown in FIG. 5 and the following figures. The supporting cylinder 19 is set up on the outside wall of the tank 16 and blocks 20 made of hard wood are fixed on the supporting elements 17 by means of bolts 21. The heat insulating supports 18, made of pressed asbestos, are fit in the supporting cylinders 19 leaving some installation clearance 22. The heat insulating supports 18 and the supporting cylinders 19 are encased in the heat insulating layers 25, which cover the tank and are supported by heat insulating material 26 in the same manner on the hull 15.

There are some variations of the supporting means, as indicated in FIGS. 7 to 12, depending on each supporting position. In some positions, the heat insulating support 18 can be suspended by means of a kernel plate located outside the heat insulating layers, instead of the above-mentioned supporting element, as shown in FIG. 9. The above-mentioned heat insulating layers are composed of heat insulating material 26 (FIG. 13) and water-proof paper 27 arranged in layers and covered with a metallic mesh 28 on its outside, and a hard cement coating 29 located within the plate 30, the layers being tightened onto the tank 16 by means of a circumscribing band. The heat insulating layers 26 are supported by the supporting members 46 of the supporting element 45 extending from the hull 15, and the kernel plate 30 is supported by another supporting member 47.

By this construction of the heat insulating layer, the outside of the tank 16 is completely covered by heat insulating material and an air layer 31 (FIG. 11) is provided between the tank 16 and the hull 15. Such a structure thus insulates against heat transfer between the tank 16 and the hull 15, allows the thermal expansion of the tank caused by the loading of the molten asphalt therein without giving extensive stress to the hull structure and ensures the safety of the hull 15. The structure, according to which the pressed heat insulating material 18 is provided between the tank and all supporting elements, prevents rapid loss of heat through the metallic joints, particularly it prevents the initiation and the growth of the solid state of the asphalt material in the tank due to partial cooling. This structure also prevents the heat transfer to the hull 15 by means of the metallic joints, the heat transfer being quite extensive, even though the metallic joints constitute relatively only a small part, keeps the temperature of the sailor room and of the engine room at ordinary room temperature, ensures the enjoyment of the ship by people on board and prevents the thermal warping of the hull structure and of various machines or instruments.

The loading and unloading of the molten asphalt in the tank 16 is carried out by equipment shown in FIGS. 14 to 18. There is provided a step formation 32 on the stern side of the tank but in front of the engine room 12. A loading pump 33 is provided at the step formation 32 and the loading pump 33 is driven by the engine operating the screw 14 through a reduction gear mechanism. The pump 33 is connected with the pipes 34, 35 having bellows-type flexible parts 36. The pipes 34, 35 have inserted therein a heating purposes, through which heated steam is passed. In order to heat the outside of the pump 33, the pump is mounted within an outer casing 48 as mentioned above, to which the heating tube 37 is led. This construction prevents the asphalt to cool and to solidify in the pipes 34, 35. The hot fluid passed through the pipe 37 can be steam, waste gas or electric current generated by the ship engine, or the same may be generated by a heat generating apparatus, specially provided on the ship. Hot fluid can also be supplied by a heat generating engine located on the shore, since the loading and unloading of asphalt is usually carried out at the pier, particularly when the ship engine is stopped. The heating tube 37 has a loop part 38 (FIG. 16) at a proper position to provide a certain flexibility in its movement. The pipe 34 is connected with an inlet 39 formed in the heat insulating material. The other pipe 35 has such construction, as shown in FIG. 10, that in the vicinity of the inlet 49 to the tank, the heating tube 37 encircles the inlet in the form of circular coil 50, to prevent the increase of viscosity and solidification of the asphalt.

In the part of the inlet 49, the loading pump 33 and the inlet branch pipe 37 to the tank 16a and to the tank 16b, there are cocks 42, 43 and 44, by which the flow of the molten asphalt is controlled or changed. These cocks are of the double operation type, in which a stopping valve is raised, to permit contact of its conical surface contact with the cock body and then the cock is opened or closed.

The pump 33 can be a super-gear type or any other type suitable for the present purpose. It has double walls, one being the outer layer 48, as mentioned above, to heat the pump by passing heated fluid between them and to make its operation smooth. A base and a bearing located before and behind the gear shaft are provided, and a high pressure unit is adopted as a lubrication means to minimize superheating caused by hot fluid flow and friction. An apparatus to cool the heated lubrication oil by seat water is also provided.

It is apparent from such construction of the cocks and the pump that asphalt never coagulates in the apparatus, while the operations are suspended and gives no difficulties to continue smooth operation.

In case the ship carrying molten material is designed for the particular purpose of performing a long voyage, the tube lines for the heating are provided on the side, the bottom and the upper wall of the tank 16. An embodiment of the heating tube lines is shown in FIGS. 19A, 19B, 20, 21A, 21B, 22A, 22B and 22C. FIG. 19A shows the tube lines on the side wall of the tank. FIG. 19B discloses the tube lines on the upper wall. FIG. 20 discloses the tube lines arranged on the bottom wall. FIG. 21A indicates the tube lines arranged on the bow side wall, FIG. 21B those on the stern side wall, and FIGS. 22A and 22B indicate those on both side walls of the stepped-down portion 32 which provides a space for the pump, as mentioned above. FIG. 22C discloses the tube lines on the front side wall, that is, on the bow side wall of the stepped down portion 32. These tube lines are so arranged as to give uniform heating effect over the entire walls of the tank. For such heating, steam, waste gas or electricity obtained from the ship engine, or from another heat generating engine, especially provided on board of the ship, or an engine located on the shore at the pier are utilized. In the part of the tube joint, the structure is constructed in such a way that it allows the flexible movement of the tubes.

Since the ship carrying the molten material can load, transport, and unload the material, like molten asphalt in its molten state, it can increase the asphalt carrying capacity of the ship. As all the loading and unloading can be carried out by means of pipes and pumps, the work can be much simplified and the loading can be completed within a shorter time with less energy requirements, thereby eliminating drum-type cans. It is not necessary to remelt the asphalt, when it is used, in contrast with the case of solid asphalt, and thus neither a heat source, nor a particular process, nor the time for remelting is necessary in the present case. The present invention provides, thus, very economical means of transportation and handling of asphalt. Therefore, the present invention has great advantages over the known methods and means.

While we have disclosed several embodiments of the present invention, it is to be understood that these embodiments are given by example only and not in a limiting sense, the scope of the present invention being determined by the objects and the claim.

We claim:

A ship for the transportation of high temperature molten material comprising a hull, an engine room including an engine, a tank disposed in said hull, supporting elements of heat insulating material for said tank and disposed between said tank and said hull, to define an air space between said hull and said tank and to provide air insulation around said tank, heat insulating material applied to said tank as layers between said hull and said tank, sheets of water-proof paper disposed between said layers of heat insulating material, a hard cement layer covering said heat insulating material, a plurality of supporting cylinders mounted on the wall of said tank and being the only connection means between said hull and said tank, said supporting elements of heat insulating material defining a clearance between said hull and said supporting cylinders, pipes for feeding molten material in and out of said tank, and means for heating said pipes in order to prevent said molten material from solidifying.

References Cited in the file of this patent

UNITED STATES PATENTS

| | | |
|---|---|---|
| 1,103,239 | Zolling | July 14, 1914 |
| 2,060,936 | Haag | Nov. 17, 1936 |
| 2,136,040 | Clarke | Nov. 8, 1938 |
| 2,563,118 | Jackson | Aug. 7, 1951 |
| 2,738,749 | Macy et al. | Mar. 20, 1956 |
| 2,746,578 | Blomeley | May 22, 1956 |
| 2,777,295 | Bliss et al. | Jan. 15, 1957 |
| 2,859,895 | Beckwith | Nov. 11, 1958 |
| 2,889,953 | Morrison | June 9, 1959 |
| 2,896,416 | Henry | July 28, 1959 |
| 2,900,995 | Dickerson et al. | Aug. 25, 1959 |
| 2,920,850 | Campbell | Jan. 12, 1960 |
| 2,933,902 | Howard | Apr. 26, 1960 |
| 2,992,622 | Maker | July 18, 1961 |

FOREIGN PATENTS

| | | |
|---|---|---|
| 284,266 | Great Britain | 1929 |
| 742,683 | Great Britain | Dec. 30, 1955 |
| 730,608 | Germany | Jan. 14, 1943 |
| 746,567 | Germany | Aug. 12, 1944 |
| 5,439 | Netherlands | Feb. 15, 1921 |
| 91,767 | Norway | May 27, 1958 |
| 81,645 | Denmark | Aug. 6, 1956 |
| 220,768 | Australia | Mar. 13, 1959 |